United States Patent Office 2,799,053
Patented July 16, 1957

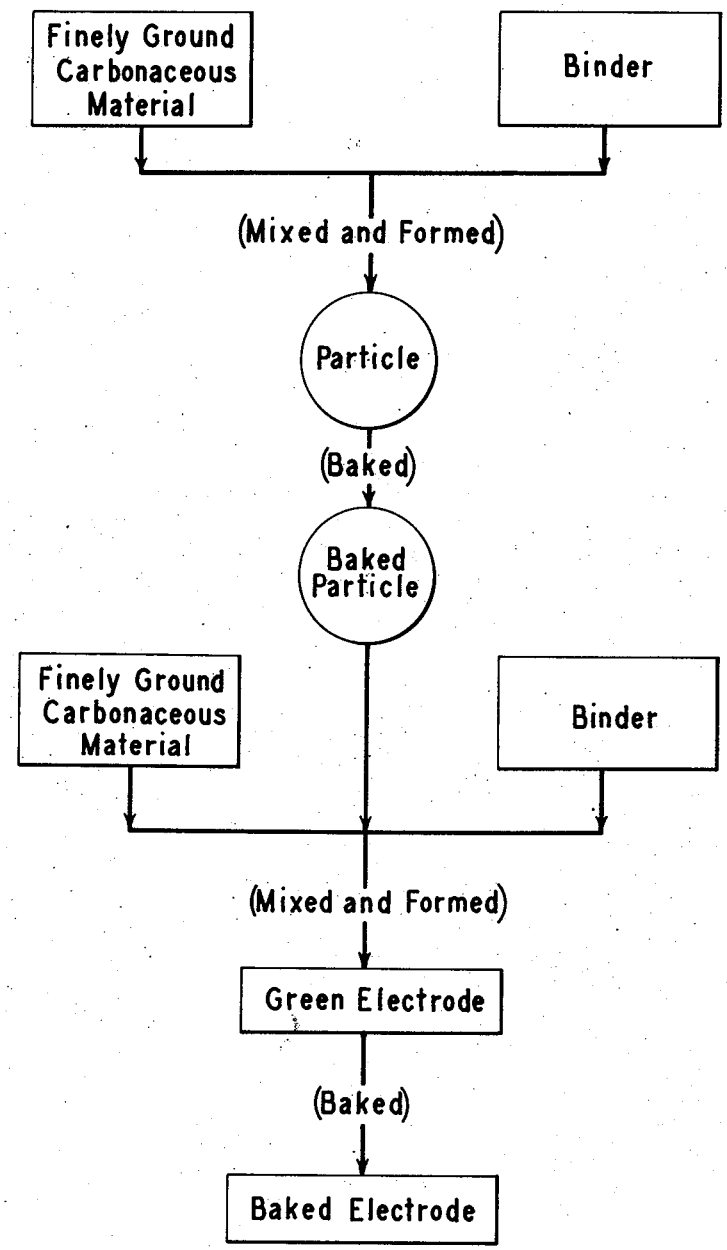

2,799,053
SHAPED CARBON ARTICLE AND PROCESS FOR PRODUCING THE SAME

Joseph W. Gartland, Lakewood, Ohio, assignor to Union Carbide and Carbon Corporation, a corporation of New York Application April 2, 1953, Serial No. 346,530

8 Claims. (Cl. 18—54.7)

This invention relates to an improvement in electrothermic electrodes. These types of electrodes operate as refractory conductors of electricity in electric furnaces. Their size is considerably larger than electrodes for most other applications, electrothermic electrodes forty inches or more in diameter not being uncommon. Their manufacture is ordinarily accomplished by an extrusion process wherein finely ground carbon or carbonaceous material, is mixed with a heated binder, commonly some form of pitch, natural pellets of crude coke are added, and the mass is extruded through a die. In order to effect mixing between the binder and the ground material the mass is heated to a temperature of from 150° C. to 200° C. The electrode thus formed is known in the art as a "green" electrode and must then be baked at high temperature. Electrothermic electrodes are commonly heated until graphitized. This process lowers the electrical resistance of the electrode, renders its qualities and properties fairly stable over a wide range of temperatures and lastly converts the low tensile strength green electrode into one which is strong and capable of withstanding hard service. The electrode thus produced must have similar transverse and longitudinal eletcrical resistance properties.

It is an object of this invention to produce an electrode for electrothermic use, yet possessing qualities of a standard general electrode, there being no areas of stress due to uneven contraction during the baking process.

Because of their size, the extrusion of the large electrothermic electrodes presents a difficulty not ordinarily encountered in the production of the smaller electrodes for other applications. When the large mass is forced through the die, flow lines appear in the eletcrode, due to orientation of the mix. This effect decreases appreciably the resistance of the electrode to thermal stress by setting up different rates of thermal expansion in the electrode. Therefore it has become the practice in the art to include in the mixture before extrusion small particles of calcined petroleum coke, the particles being present as about 30 percent to 60 percent by weight of the total mixture. These particles effectively break up the orientation flow lines, but are still present in the finished electrode, not being appreciably affected by the baking process.

While the addition of the coke particles solves the problem of the flow lines by deorientating the material, their presence during the baking process presents a serious difficulty. The beneficial effects of the baking of the green electrode are achieved by the distillation cracking action of the heat on the pitch binder. As the temperature increases the binder successively softens, melts, loses its lighter constituents by vaporization, and finally is converted into coke. As the process occurs, the electrode material is reduced in volume, and as the coke particles are relatively unaffected by the heat, a preferential shrinkage occurs. The consequent stresses and strains set up within the material of the electrode tend to weaken it by cutting down the mechanical strength and electrical conductivity of the finished electrode.

I have discovered that the deorientation effects of the coke particles can be achieved, and weakening of the final product avoided by substituting for the natural coke particles synthetic particles made in the following manner. A heated mixture of finely ground carbon or carbonaceous material and a suitable binding agent such as coal tar or coal tar pitch is baked at a temperature in the range of 400° C. to 700° C. The baked material is then broken up and particles at least 1/16 inch in diameter are then screened out for use. Or, alternatively, the particles may be formed as pellets before baking and thus be ready for immediate use after baking with no loss of fines from a crushing operation.

When synthetic particles made according to the invention are used in place of natural coke particles in the electrode mix, the particles shrink at the same rate as the surrounding matrix when the electrode is baked, the weakening stresses and strains due to preferential shrinkage are avoided, and a superior electrode is produced.

The drawing is a schematic representation of the invention. In the drawing at the top are shown the finely ground carbonaceous material and the binder which are mixed and formed into particles, as shown. The particle is next baked as shown and then mixed with more finely ground carbonaceous material and binder and the mixture formed into a green electrode, as shown. The green electrode is then baked to yield a baked eletcrode, as shown.

The use of synthetic particles according to this invention produces an electrothermic electrode of superior apparent density, electrical conductivity, and mechanical strength, as the following example shows:

| Properties | Electrode extruded with— | |
| --- | --- | --- |
| | ordinary coke particles | synthetic particles made according to invention |
| Apparent Density (g./cc.) | 1.56 | 1.64 |
| Specific Resistance (micro-ohm inch) | 370 | 345 |
| Flexural Strength (p. s. i.) | 1,870 | 2,175 |
| Young's Modulus (p. s. i.) | 803,000 | 990,000 |

While the particles of this inventon have been referred to in terms of using them for producing electrothermic electrodes, and they are particularly suitable for this, they would also be quite useful in making any shaped carbon or shaped graphite article, where it is desired to avoid flow lines. Thus, the particles of the invention are not limited to use solely in making electrothermic electrodes.

I claim:

1. A process for producing shaped carbon objects comprising mixing finely ground carbonaceous material with a binding agent, baking said mixture at a temperature between 400° and 700° C., comminuting said mixture and screening therefrom baked synthetic particles, at least 1/16 inch in approximate diameter, mixing said baked particles with finely ground carbonaceous material and a binding agent, said baked particles comprising 30 to 60 percent by weight of the mixture, shaping the mixture in the desired manner, and then baking said shaped object.

2. A process for producing electrothermic electrodes comprising mixing finely ground carbonaceous material with a binding agent, baking said mixture at a temperature between 400° and 700° C., comminuting and screening therefrom baked synthetic particles at least 1/16 inch in approximate diameter, mixing said baked particles with finely ground carbonaceous material and a binding agent, said baked particles comprising 30 to 60 percent by weight of the mixture extruding the mixture in the shape of an electrode, and then baking said electrode.

3. A process for producing shaped carbon objects comprising mixing finely ground carbonaceous material with a binding agent, forming said mixture into synthetic particles at least ⅟₁₆ inch in approximate diameter, baking said particles at a temperature between 400° and 700° C., mixing said baked synthetic particles with finely ground carbonaceous material and a binding agent, said baked particles comprising 30 to 60 percent by weight of the mixture shaping the mixture in the desired manner, and then baking said shaped object.

4. A process for producing electrothermic electrodes comprising mixing finely ground carbonaceous material with a binding agent, forming said mixture into synthetic particles at least ⅟₁₆ inch in approximate diameter, baking said particles at a temperature between 400° and 700° C., mixing said baked synthetic particles with finely ground carbonaceous material and a binding agent, said baked particles comprising 30 to 60 percent by weight of the mixture extruding the mixture in the shape of an electrode, and then baking said electrode.

5. A process for producing synthetic particles for use in the making of shaped carbon objects including electrothermic electrodes, comprising mixing finely ground carbonaceous material with a binding agent, baking said mixture at a temperature between 400° and 700° C., comminuting said mixture and screening therefrom baked synthetic particles at least ⅟₁₆ inch in approximate diameter.

6. A process for producing synthetic particles for use in the making of shaped carbon objects including electrothermic electrodes, comprising mixing finely ground carbonaceous material with a binding agent, forming said mixture into particles at least ⅟₁₆ inch in approximate diameter, and then baking said synthetic particles at a temperature between 400° and 700° C.

7. A green shaped carbon object formed from a mixture comprising finely ground carbonaceous material, a binding agent, and 30 to 60 percent by weight of baked synthetic particles at least ⅟₁₆ inch in approximate diameter comprising a mixture of finely ground carbonaceous material and a binding agent baked at a temperature between 400° and 700° C.

8. A green electrothermic electrode extruded from a mixture comprising finely ground carbonaceous material, a binding agent, and 30 to 60 percent by weight of baked synthetic particles at least ⅟₁₆ inch in approximate diameter comprising a mixture of finely ground carbonaceous material and a binding agent baked at a temperature between 400° and 700° C.

References Cited in the file of this patent

UNITED STATES PATENTS

| | | |
|---|---|---|
| 2,148,133 | Reuschler et al. | Feb. 21, 1939 |
| 2,376,760 | Elsey | May 22, 1945 |
| 2,563,285 | Shea et al. | Aug. 7, 1951 |